(No Model.) 2 Sheets—Sheet 1.

G. H. ZEMPTER, R. A. MANNING & G. W. OVERALL.
COTTON HARVESTER.

No. 483,824. Patented Oct. 4, 1892.

Witnesses;
Percy C. Bowen
John C. Toileau

Inventors;
George H. Zempter,
Reuben A. Manning,
George W. Overall
By Whitman + Wilkinson
Attorneys.

THE NORRIS PETERS CO., PHOTO-LITHO., WASHINGTON, D. C.

(No Model.) 2 Sheets—Sheet 2.
G. H. ZEMPTER, R. A. MANNING & G. W. OVERALL.
COTTON HARVESTER.

No. 483,824. Patented Oct. 4, 1892.

Witnesses
Percy C Bowen
John Q Wilson

Inventors:
George H. Zempter,
Reuben A. Manning,
George W. Overall
By Whitman & Wilkinson
Attorneys

UNITED STATES PATENT OFFICE.

GEORGE H. ZEMPTER, REUBEN A. MANNING, AND GEORGE W. OVERALL, OF MEMPHIS, TENNESSEE.

COTTON-HARVESTER.

SPECIFICATION forming part of Letters Patent No. 483,824, dated October 4, 1892.

Application filed April 2, 1892. Serial No. 427,527. (No model.)

*To all whom it may concern:*

Be it known that we, GEORGE H. ZEMPTER, REUBEN A. MANNING, and GEORGE W. OVERALL, citizens of the United States, residing at Memphis, in the county of Shelby and State of Tennessee, have invented certain new and useful Improvements in Cotton-Harvesters; and we do hereby declare the following to be a full, clear, and exact description of the invention, such as will enable others skilled in the art to which it appertains to make and use the same.

Our invention relates to machines for picking cotton; and it consists of certain novel features hereinafter described and claimed.

Reference is had to the accompanying drawings, wherein the same parts are indicated by the same letters.

Figure 1:
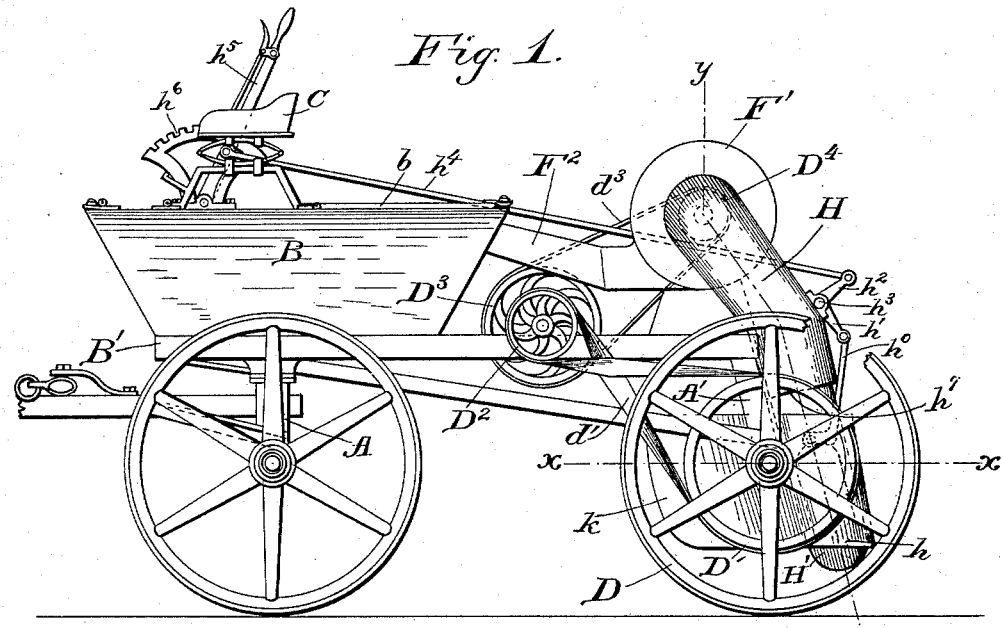
Figure 2:
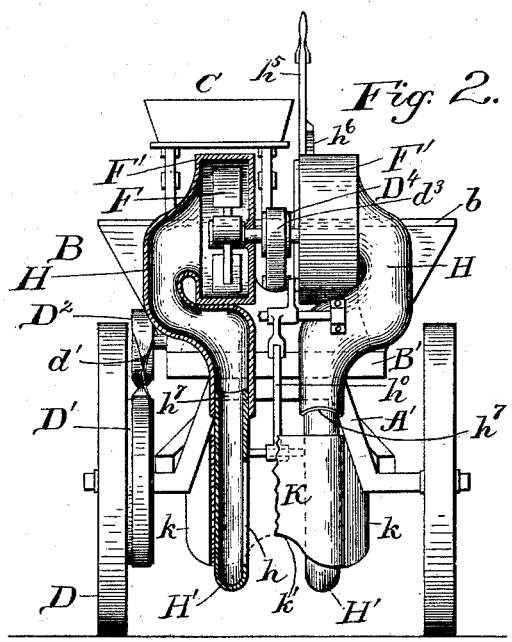
Figure 3:
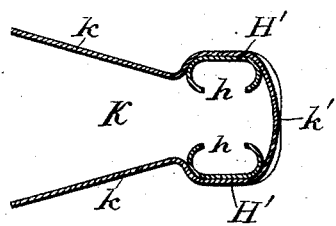
Figure 4:
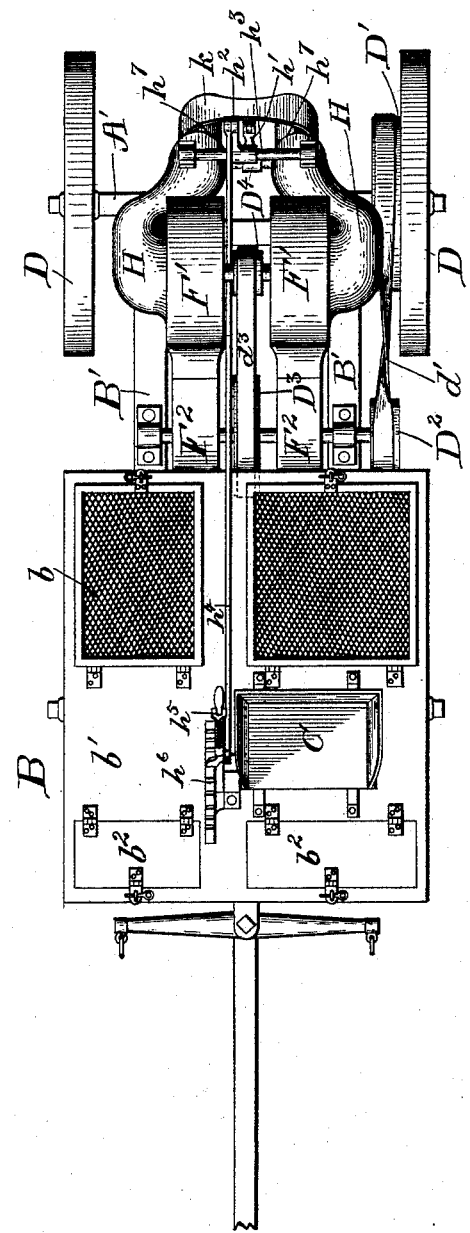

Figure 1 represents a side elevation of the machine for picking cotton. Fig. 2 represents a rear view of the cotton-picker, the left half of the machine being shown in section on the line $y\ y$ of Fig. 1; and Fig. 3 represents a section of the suction-pipes and centering-plate along the line $x\ x$ of Fig. 1. Fig. 4 represents a plan view of the machine.

A represents the front axle, and A' the rear axle, both of which should be bent upward in the center to pass clear of the cotton-plants.

B represents a box or receiver carried upon the framework B' and having a wire cover or screen $b$, the said box acting as a receptacle for the picked cotton.

C represents the driver's seat.

D represents a hind wheel, attached to which and turning therewith is the drum D', on which moves the belt $d'$, which is crossed, as shown. This belt turns the fast pulley $D^2$ on the same shaft with another fast pulley $D^3$, which latter is connected by the belt $d^3$ to the pulley $D^4$ on the same shaft with the fans F. These fans revolve in air-chambers F' and suck in air through the pipes H, delivering the air and cotton through the pipes $F^2$ into the wire-covered box B. These pipes may be made either flexible at their lower ends or telescopic, as shown at $h^7$, with hole $h$ in the inner side thereof. This lower section H' may be raised or lowered to suit the height of the cotton-plants in any suitable way. One method of doing this is shown in Fig. 1, where $h^0$ represents a rod attached at its upper end to a bell-crank lever pivoted to the upper section H at $h^3$ and having arms $h'$ and $h^2$, to the upper one of which the rod $h^4$ is pivoted. This rod is pivotally connected to the hand-lever $h^5$, which may be held at any desired position by a spring-pawl engaging in the rack-bar $h^6$.

K represents a bent plate having wings $k$ and curved rear portion $k'$, in which the ends of the suction-tubes H' are free to move up and down, as shown. These wings $k$ pass on either side of the cotton-plants and guide the branches into the rear curved portion $k'$ of the bent plate and in front of the apertures $h$ in the suction-tubes H'.

The operation of the device is as follows: The harvester is drawn with its wheels astride of the rows of cotton-plants, the bent axles enabling all the parts of the vehicle to be kept clear of the plants until the plate K is reached. Here the stalks and all the spreading branches are guided into the space between the holes $h$, and the cotton is sucked from the bolls by the rapidly-revolving fans F. It is carried through the fans and blown through the pipe $F^2$ into the wire-covered box B. The air escapes through the meshes in the wire and the cotton remains on the inside of the box, whence it may be removed when desired.

It will be obvious that only one fan need be used, that the holes in the tubes H' may be on the outside and not on the inside and may pick from the sides of the adjacent rows, and that the device might be altered in many mechanical details without departing from the spirit of our invention.

What we claim as new, and desire to secure by Letters Patent of the United States, is—

1. In a machine for picking cotton impelled by any suitable power, the combination, with a wheeled frame, of a fan or fans revolving in a closed air-chamber, a suction-tube formed in two sections, with a telescopic joint connected to said fan, the lower section of said tube opening at or near the cotton-plants for drawing in the cotton, a system of levers for raising and lowering said lower section, a delivery-tube leading from said fan for the discharge of the cotton from the fan, and a receptacle for the cotton at the end of said delivery-tube, the said receptacle having an apertured cover, substantially as described.

2. In a machine for picking cotton impelled by any suitable power, the combination, with a wheeled frame, of two fans revolving in two closed air-chambers, two suction-tubes, each formed in two sections, with a telescopic joint connected to said air-chamber, with openings on the inner side of each for sucking in the cotton, and means for raising and lowering the lower ends of said suction-tubes, a guide-plate having a flaring mouth opening on either side of said suction-tube for guiding the cotton-plants in front of said openings, a delivery-tube leading from said air-chamber, and a receptacle at the end of said delivery-tube, with a wire screen or screens covering said receptacle, substantially as and for the purposes described.

3. In a machine for picking cotton impelled by any suitable power, the combination, with a wheeled frame, of the driving-pulley $D'$, attached to one of the wheels of said frame, the belt $d'$, the pulleys $D^2$ and $D^3$, keyed on the same shaft, the belt $d^3$, the pulley $D^4$, and fans F, keyed on the same shaft, the telescopic suction-tubes $H'$, with means for raising the lower end of the same, the delivery-tubes $F^2$, and the receptacle B, having perforated cover, substantially as and for the purposes described.

4. In a machine for picking cotton impelled by any suitable power, the combination, with a wheeled frame, of the driving-pulley $D'$, attached to one of the wheels of said frame, the belt $d'$, the pulleys $D^2$ and $D^3$, keyed on the same shaft, the belt $d^3$, the pulley $D^4$, and fans F, keyed on the same shaft, the telescopic suction-tubes $H'$ the rod $h^0$, connected to the movable section of said tubes, the hand-lever $h^5$, rod $h^4$, and a bell-crank lever connecting said rods $h^4$ and $h^0$, whereby the lower end of the said suction-tubes may be raised or lowered, the delivery tubes $F^2$, and the receptacle B, having a perforated cover, substantially as and for the purposes described.

In testimony whereof we affix our signatures in presence of two witnesses.

GEORGE H. ZEMPTER.
REUBEN A. MANNING.
GEORGE W. OVERALL.

Witnesses:
K. BUTTENBURG,
PLEXIE THOMAS.